(12) United States Patent
Baker et al.

(10) Patent No.: US 8,665,268 B2
(45) Date of Patent: Mar. 4, 2014

(54) IMAGE DATA AND ANNOTATION PROCESSING SYSTEM

(75) Inventors: Scott Baker, Edwardsburg, MI (US); Danyu Liu, Hanover Park, IL (US); Stefan LautenschLäger, Hausen (DE)

(73) Assignees: Siemens Aktiengesellschaft, Munich (DE); Siemens Medical Solutions USA, Inc., Malvern, PA (US)

( * ) Notice: Subject to any disclaimer, the term of this patent is extended or adjusted under 35 U.S.C. 154(b) by 436 days.

(21) Appl. No.: 12/815,712

(22) Filed: Jun. 15, 2010

(65) Prior Publication Data

US 2011/0072397 A1 Mar. 24, 2011

Related U.S. Application Data

(60) Provisional application No. 61/244,596, filed on Sep. 22, 2009.

(51) Int. Cl.
*G06T 15/40* (2011.01)
*G06T 17/00* (2006.01)
*G06K 9/00* (2006.01)

(52) U.S. Cl.
USPC ............ 345/421; 345/420; 382/132; 382/128

(58) Field of Classification Search
None
See application file for complete search history.

(56) References Cited

U.S. PATENT DOCUMENTS

| | | | |
|---|---|---|---|
| 5,377,314 A | 12/1994 | Bates et al. | |
| 5,751,927 A | 5/1998 | Wason | |
| 7,694,238 B2 | 4/2010 | Gibson et al. | |
| 8,244,025 B2 * | 8/2012 | Davis et al. | 382/154 |
| 2005/0163356 A1* | 7/2005 | Makram-Ebeid et al. | 382/128 |
| 2005/0210444 A1* | 9/2005 | Gibson et al. | 717/108 |
| 2008/0129825 A1* | 6/2008 | DeAngelis et al. | 348/169 |
| 2010/0034451 A1* | 2/2010 | Hughes | 382/132 |
| 2010/0080354 A1* | 4/2010 | Fu et al. | 378/65 |
| 2011/0072397 A1* | 3/2011 | Baker et al. | 715/852 |

* cited by examiner

*Primary Examiner* — Kee M Tung
*Assistant Examiner* — Leon T Cain, II
(74) *Attorney, Agent, or Firm* — Brennan K Bradley

(57) ABSTRACT

A system automatically detects objects in an image and automatically displays a chosen object if the object is not currently visible in real time. An image data processing system automatically displays potentially hidden features in 3D (three dimensional) medical image data. A repository includes a 3D (three dimensional) image dataset representing an anatomical volume of interest. An image data processor processes the dataset retrieved from the repository by, (a) automatically detecting if a first object is obscured by a second object in the 3D image dataset, (b) automatically determining if the first object is visible by rotating the anatomical volume of interest and (c) rotating the anatomical volume of interest until the first object is visible in response to a command. A display processor initiates display of the rotated anatomical volume of interest.

20 Claims, 11 Drawing Sheets

IMAGE DATA AND ANNOTATION PROCESSING SYSTEM

This is a non-provisional application of provisional application Ser. No. 61/244,596 filed 22 Sep. 2009, by S. Baker et al.

FIELD OF THE INVENTION

This invention concerns an image data processing system for automatically displaying potentially hidden features in 3D (three dimensional) medical image data by automatically detecting if an object is obscured by another object and rotating a 3D volume to reveal hidden features.

BACKGROUND OF THE INVENTION

In known medical image processing systems, a user is able to create a mesh that defines an edge of a volume of interest (e.g., a heart chamber) in a 3D image. Upon defining a mesh, the user is able to place annotation objects to mark places of interest. These annotation objects, which are themselves 3D mesh objects, can be placed either on the mesh or inside of the chamber hidden by the mesh outlining the chamber. Obscuring annotation objects in a medical or other type of image is likely to cause a problem and render the user unaware of potentially important objects. Known systems may allow opacity of the chamber mesh in the image to be reduced to promote visibility of the annotation. However reducing opacity reduces contrast level and visibility of features in the image. A system according to invention principles addresses these deficiencies and related problems.

SUMMARY OF THE INVENTION

A system automatically detects objects (e.g., annotation objects) in an image, provides a list of placed objects and in real time automatically displays a chosen object if the object is not currently visible. An image data processing system automatically displays potentially hidden features in 3D (three dimensional) medical image data. A repository includes a 3D (three dimensional) image dataset representing an anatomical volume of interest. An image data processor processes the dataset retrieved from the repository by, (a) automatically detecting if a first object is obscured by a second object in the 3D image dataset, (b) automatically determining if the first object is visible by rotating the anatomical volume of interest and (c) rotating the anatomical volume of interest until the first object is visible in response to a command. A display processor initiates display of the rotated anatomical volume of interest.

BRIEF DESCRIPTION OF THE DRAWING

FIG. 3 illustrates processing of the system when an annotation object is already visible, according to invention principles.

FIG. 4 illustrates automatic real time determination that an annotation object is located inside a mesh and will not be made visible by rotation and initiation of generation of data representing an image cross-section through the anatomical volume of interest to show the annotation object, according to invention principles.

FIG. 5 shows an image cross-section through the anatomical volume of interest to show the annotation object of FIG. 4, according to invention principles.

FIG. 6 illustrates automatic real time determination that an annotation object is hidden but not surrounded by a mesh and is visible upon rotation of a volume of interest, according to invention principles.

FIG. 7 illustrates rotation of the volume of interest of FIG. 6 so that the annotation object is visible, according to invention principles.

FIG. 8 illustrates a hidden annotation object that is hidden but not completely surrounded by a mesh, according to invention principles.

FIG. 9 illustrates an updated scene including a hidden but not completely surrounded object, according to invention principles.

FIG. 10 illustrates automatic real time determination that a chosen object is currently visible, according to invention principles.

DETAILED DESCRIPTION OF THE INVENTION

The inventors have advantageously recognized a need for a system to detect objects in an image, provide a list of placed objects and to automatically display a chosen object if the object is not currently visible in real time. In contrast in known systems a user typically has to manually search for an object which is time consuming and burdensome. A system automatically detects objects (e.g., annotation objects) in an image, provides a list of placed objects and automatically displays a chosen object if the object is not currently visible in real time. Although the invention is described in the context of enabling an annotation object to be visible, any object or feature may be made visible by the system. The system simplifies a user workflow and reduces the time needed to perform image interpretation by substantially eliminating a need for a manual search for (e.g., annotation) objects. In one embodiment, the system generates a cross-section through an object parallel to a viewing screen. In another embodiment, the system automatically reduces the opacity of a heart chamber mesh, for example, so that annotation objects can be seen, however if multiple annotation objects are present, one or more objects may still be obscured.

Figure 1:
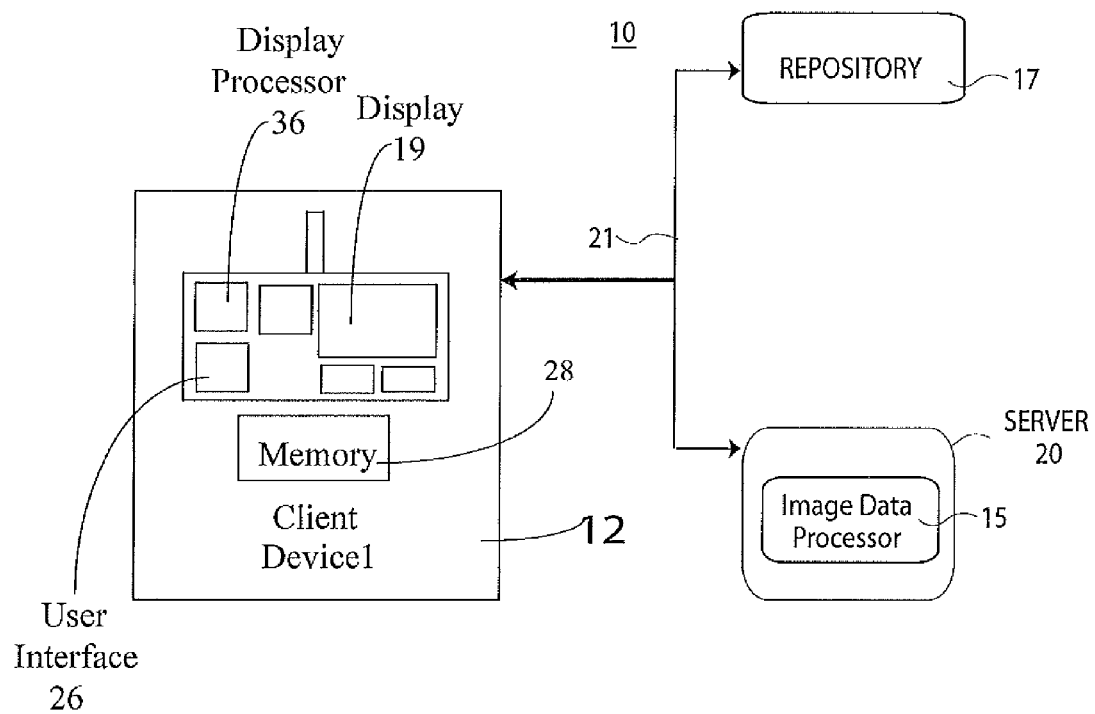
FIG. 1 shows an image data processing system for automatically displaying potentially hidden features in 3D (three dimensional) medical image data, according to invention principles.

FIG. 1 shows image data processing system 10 for automatically displaying potentially hidden features in 3D (three dimensional) medical image data. System 10 includes one or more processing devices (e.g., computers, workstations or portable devices such as notebooks, Personal Digital Assistants, phones) 12 that individually include a user interface (e.g., a cursor) device 26 such as a keyboard, mouse, touchscreen, voice data entry and interpretation device, at least one display monitor 19, display processor 36 and memory 28. System 10 also includes at least one repository 17 and server 20 intercommunicating via network 21. Display processor 36 provides data representing display images comprising a Graphical User Interface (GUI) for presentation on at least one display 19 of processing device 12 in response to user commands entered using device 26. At least one repository 17 stores 2D and 3D image datasets comprising medical image studies for multiple patients in DICOM compatible (or other) data format. A medical image study individually includes multiple image series of a patient anatomical portion which in turn individually include multiple images.

Server 20 includes image data processor 15. In alternative arrangements, image data processor 15 may be located in device 12 or in another device connected to network 21. Repository 17 includes a 3D (three dimensional) image dataset representing an anatomical volume of interest. Image data processor 15 processes the dataset retrieved from repository 17 by, (a) automatically detecting if a first object is obscured by a second object in the 3D image dataset, (b) automatically determining if the first object is visible by rotating the anatomical volume of interest and (c) rotating the anatomical volume of interest until the first object is visible in response to a command. Display processor 36 initiates display of the rotated anatomical volume of interest.

FIGS. 3-10 show different scenarios that occur with respect to annotations objects being placed around a mesh and how system 10 processes the annotation objects. A 3D image viewer application enables a user to create image volume segmentations that result in meshes that surround chambers of interest. For example, for a CT (computed tomography) anatomical imaging dataset of the heart, a user can segment out a Left Atrium in order to identify an edge of the left atrium chamber. A user places annotation objects (e.g., ablation points) to mark places of interest on a created mesh. Annotation points may mark places at which a reading of electrical properties is desired, or indicate places to ablate, for example. As each annotation point is added to a mesh, information about the point is also automatically added to a list in a dialog associated with the annotation point. In one embodiment a user is able to select a point from the dialog list and select a "Go To" button in order to adjust views to display the selected annotation.

In FIGS. 3-10, Line_ER (line) 303 is an eye ray (to a viewer eye) that is projected from the front of monitor screen 315 at an eye position 310 through the centroid of an annotation object being analyzed to the back of the current volume space perpendicular to monitor screen 315. Each Figure shows one annotation object and an outline indicating where mesh 305 is located on a plane containing Line_ER 303 that is orthogonal to monitor screen 315. Small circles 320 and 323 identify intersections of Line_ER 303 and mesh 305. In a 3 dimensional scene, an annotation object is visible when an intersection point of line 303 and the object is nearer to the eye than other meshes or annotation objects in the scene. Line 303 comprises a line connecting the centroid of the annotation object and eye. An annotation object is hidden whenever it is not visible.

Figure 2:
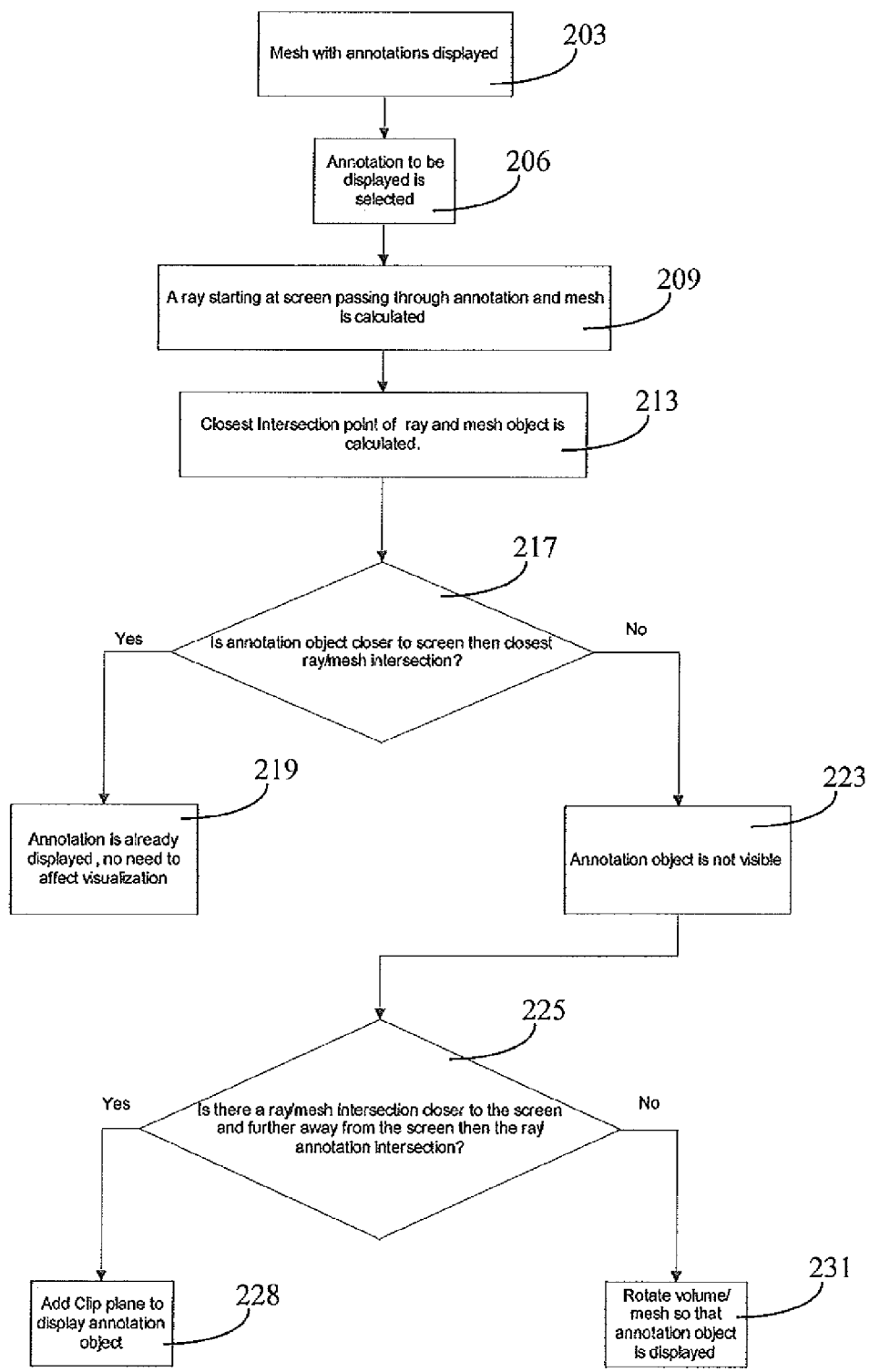
FIG. 2 shows a flowchart used by an image data processing system for automatically displaying potentially hidden features in 3D (three dimensional) medical image data, according to invention principles.
Figure 3:
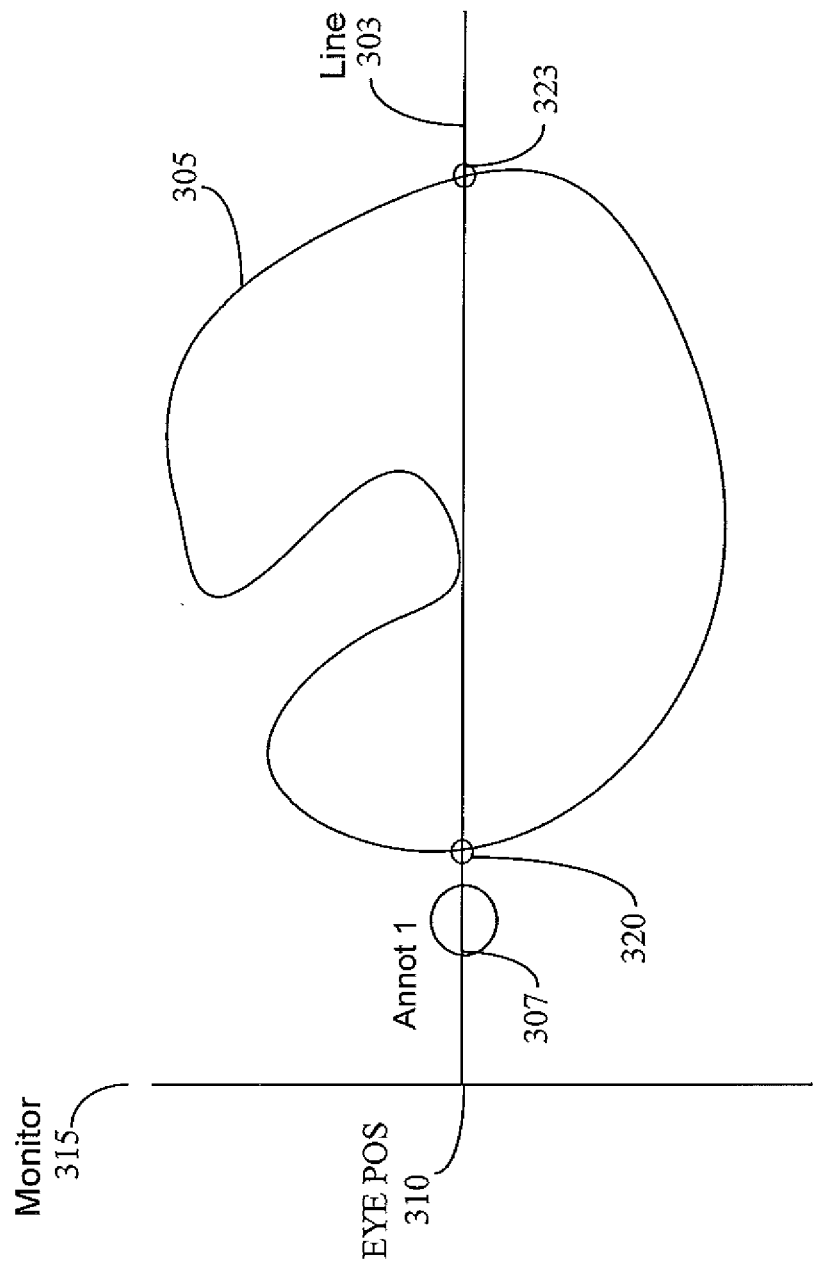
FIGS. 3-10 illustrate how the system processes annotation objects and show an annotation object and an outline indicating where a mesh is located on a plane including a line (Line_ER) orthogonal to a monitor, as follows.
Figure 10:
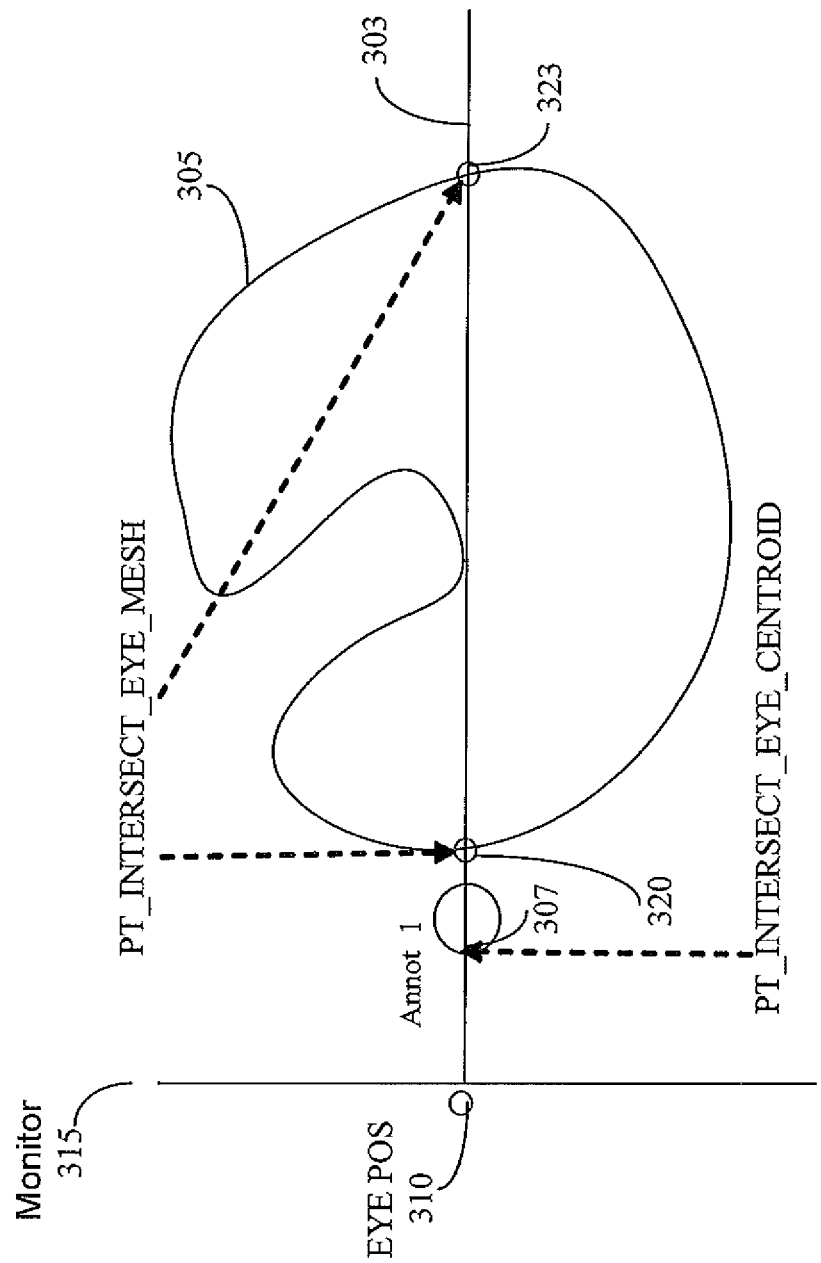

FIG. 2 shows a flowchart used by image data processing system 10 (FIG. 1) for automatically displaying potentially hidden features in 3D (three dimensional) medical image data. A user selects an annotation object to be displayed in step 206 (FIG. 2) following presentation in step 203 of a mesh that defines an edge of a volume of interest (e.g., a heart chamber) in a 3D image and associated annotations. FIGS. 3 and 10 illustrate processing by system 10 (FIG. 1) in the case that annotation object 307 is already visible. In step 209, image data processor 15 (FIG. 1) calculates a line projection from eye position 310 through the centroid of the annotation object 307 being analyzed to the back of the volume space perpendicular to monitor screen 315.

In step 213 image data processor 15 determines a closest intersection point of projection line 303 and mesh 305. FIG. 10 illustrates automatic real time determination by image data processor 15 that a chosen object 307 is currently visible. The location of the eye POS_EYE 310 is determined by a projected location along line 303 of the centroid of the annotation object on the screen. Line 303 connects POS_EYE 310 with the centroid of the annotation object and continues toward the back of the volume. The point PT_INTERSECT_EYE_CENTROID 320 is the nearest intersected point between the line 303 and mesh 305 of the annotation object. If there are no other meshes or annotation objects that intersect line 303 closer to POS_EYE 310 than PT_INTERSECT_EYE_CENTROID, the PT_INTERSECT_EYE_CENTROID is visible, otherwise, it is hidden. In automatically displaying hidden objects processor 15 determines if the computed PT_INTERSECT_EYE_CENTROID can be displayed as a visible object by rotating the scene (volume), the system determines if PT_INTERSECT_EYE_CENTROID is the furthest intersection of line 303 and mesh 305 and objects in the scene. If so, the scene can be rotated so that the object of interest is visible. If processor 15 determines PT_INTERSECT_EYE_CENTROID cannot be made visible by rotating the scene, processor 15 automatically displays a cross-section through the object perpendicular to line 303 and shifted so that the plane of the cross-section contains the centroid of the object. Image data processor 15 determines the following coordinates:

POS_EYE 310=(0,0,0)
PT_INTERSECT_EYE_CENTROID 307=(10, 0, 0)
PT_INTERSECT_EYE_MESH 1 320=(16, 0, 0)
PT_INTERSECT_EYE_MESH 2 323=(60, 0, 0)

Therefore the distance between POS_EYE 310 and PT_INTERSECT_EYE_CENTROID 307 is 10 units. The distance between POS_EYE 310 and PT_INTERSECT_EYE_MESH 1 320 is 16 units and the distance between POS_EYE 310 and PT_INTERSECT_EYE_MESH 2 323 is 60 units. Since the distance from POS_EYE to PT_INTERSECT_EYE_CENTROID is less than the distance to either of the mesh intersection points, processor 15 in step 217 determines object 307 is closer to screen 315 than the closest mesh intersection point 320 and the annotation is already visible. The intersections of Line_ER 320 and 323 and mesh 305 occur at a greater distance from monitor screen 315 than annotation object 307. So in this case image data processor 15 determines in step 219 nothing else needs to be done for the annotation to be displayed.

In step 217, if image data processor 15 determines the distance from POS_EYE to PT_INTERSECT_EYE_CENTROID is not less than the distance to either of the mesh intersection points, processor 15 in step 217 determines an object is not closer to screen 315 than the closest mesh intersection point and that the annotation is not visible in step 223. In one case, processor 15 in step 225 determines intersection points 320 and 323 of projection line 303 and mesh 305 are less than and further away than an intersection point of line 303 and the object i.e. points 320 and 323 encompass the object.

Figure 4:
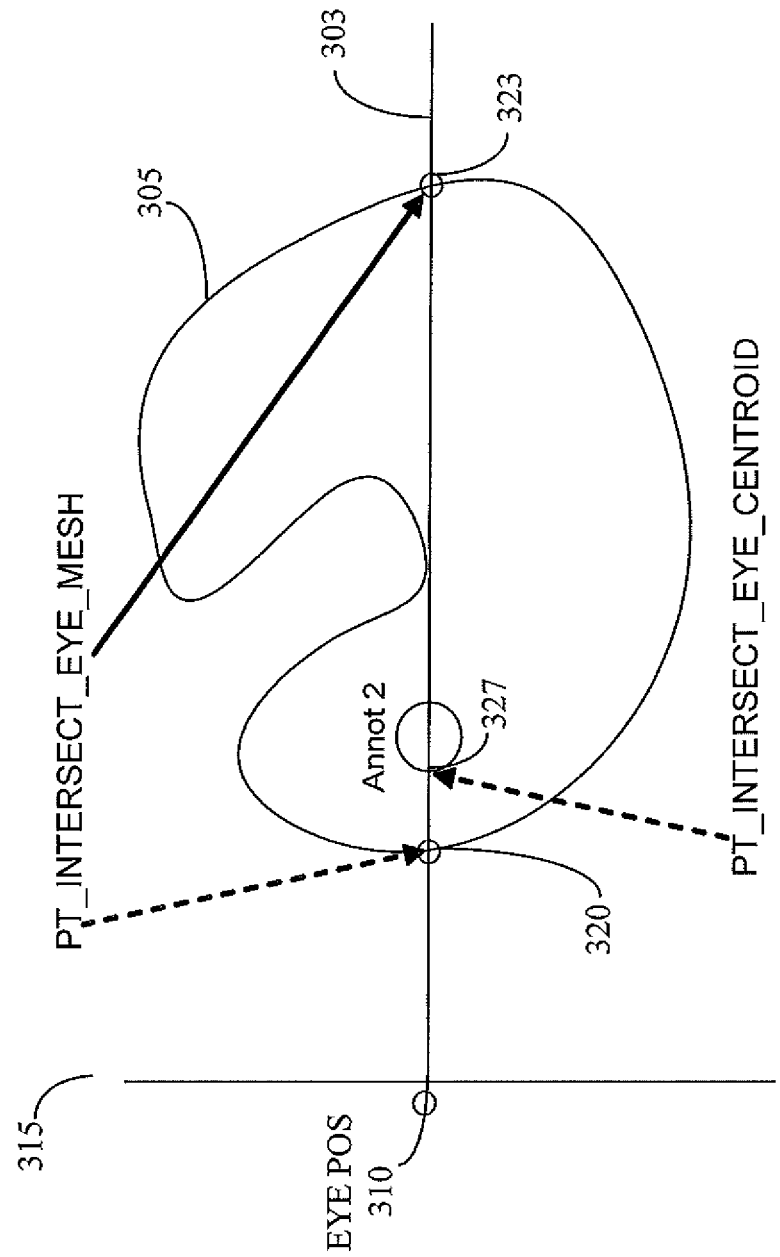

FIG. 4 illustrates automatic real time determination that an annotation object is located inside a mesh and will not be made visible by rotation. In response to this determination, processor 15 initiates generation of data representing an image cross-section through the anatomical volume of interest to show the annotation object. First intersection 320 of line 303 and the mesh 305 occurs at a lesser distance from monitor screen 315 than an intersection of line 303 and annotation object 327, and another intersection 323 of line 303 and mesh 305 occurs at a greater distance from screen 315 than an intersection of line 303 and annotation object 327. Image data processor 15 determines the following coordinates:

POS_EYE 310=(0,0,0)
PT_INTERSECT_EYE_CENTROID 327=(20, 0, 0)
PT_INTERSECT_EYE_MESH 1 320=(16, 0, 0)
PT_INTERSECT_EYE_MESH 2 323=(60, 0, 0)

Figure 5:
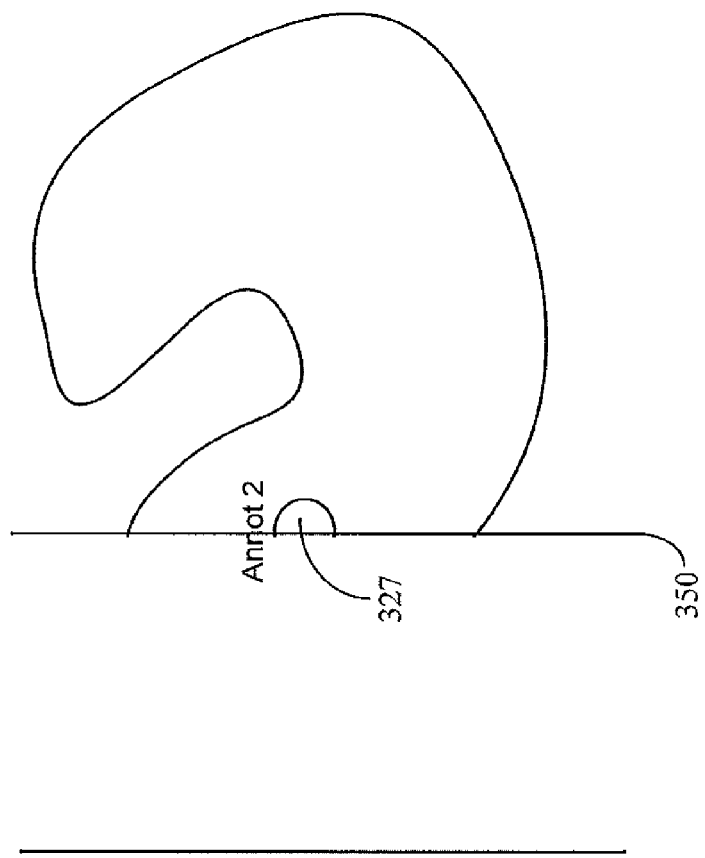

Therefore the distance between POS_EYE 310 and PT_INTERSECT_EYE_CENTROID 327 is 20 units. The distance between POS_EYE 310 and PT_INTERSECT_EYE_MESH 1 320 is 16 units and the distance between POS_EYE 310 and PT_INTERSECT_EYE_MESH 2 323 is 60 units. Since the distance from POS_EYE 310 to PT_INTERSECT_EYE_CENTROID 327 is greater than the distance to one of the mesh intersection points (PT_INTERSECT_EYE_MESH 1 320) but less than the distance to another mesh intersection point (PT_INTERSECT_EYE_MESH 2 323), processor 15 determines that object 327 is surrounded by mesh 305 and mesh 305 cannot be rotated to display object 327. Therefore, as illustrated in FIG. 5 processor 15 in step 228 displays an image cross-section 350 through mesh 305 comprising an anatomical volume of interest to show annotation object 327 of FIG. 4. Cross-section 350 cuts through the centroid of annotation object 327 and is parallel to monitor screen 315.

Figure 6:
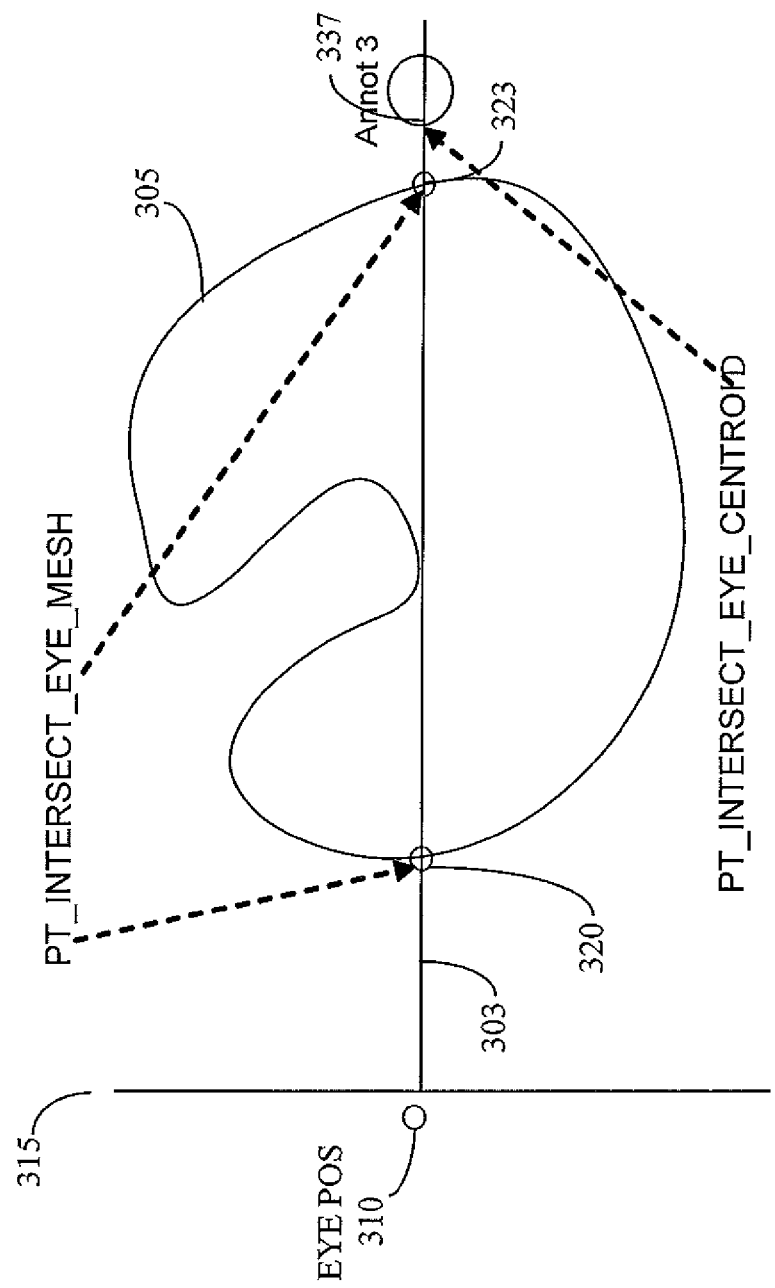

In a further case, processor 15 in step 225 determines intersection points of projection line 303 and mesh 305 do not encompass an intersection point of line 303 and an object. FIG. 6 illustrates automatic real time determination that annotation object 337 is hidden but not surrounded by a mesh and is visible upon rotation of a volume of interest. Image data processor 15 determines that intersections 320 and 323 of line 303 and mesh 305 occur at a lesser distance from screen monitor 315 than an intersection of line 303 and annotation object 337. Image data processor 15 determines the following coordinates:

POS_EYE 310=(0,0,0)
PT_INTERSECT_EYE_CENTROID 337=(63, 0, 0)
PT_INTERSECT_EYE_MESH 1 320=(16, 0, 0)
PT_INTERSECT_EYE_MESH 2 323=(60, 0, 0)

Figure 7:
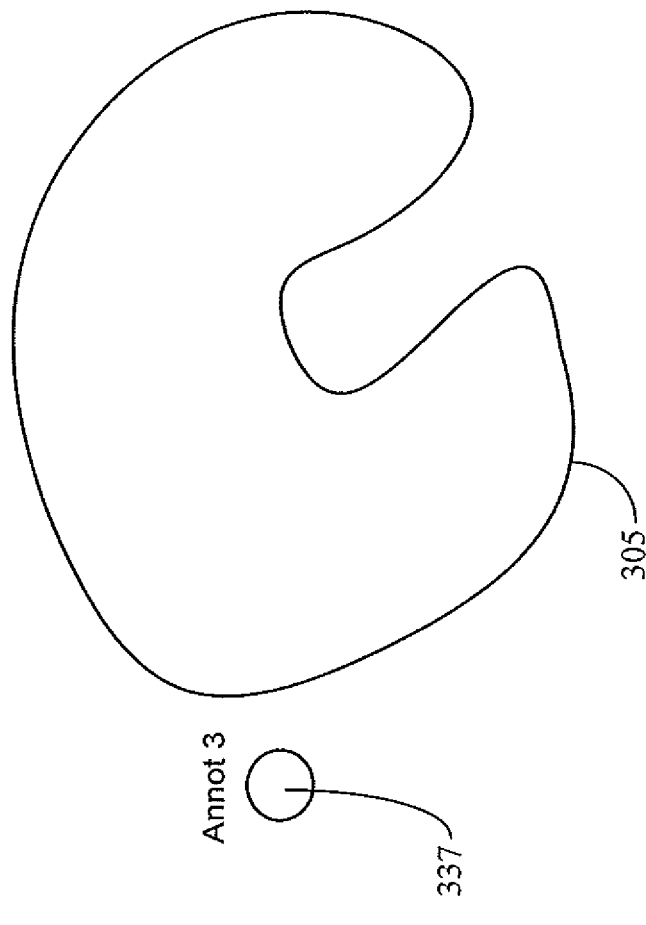

Therefore, the distance between POS_EYE 310 and PT_INTERSECT_EYE_CENTROID 337 is 63 units. The distance between POS_EYE 310 and PT_INTERSECT_EYE_MESH 1 320 is 16 units, the distance between POS_EYE 310 and PT_INTERSECT_EYE_MESH 2 323 is 60 units. Since the distance from POS_EYE 310 to PT_INTERSECT_EYE_CENTROID 337 is greater than the distance to both of the mesh 305 intersection points, processor 15 determines annotation object 337 is currently not visible but mesh 305 can be rotated in order to display the annotation. Processor 15 in step 231 rotates the volume including mesh 305 and object 337 180 degrees in order to make object 337 visible. FIG. 7 illustrates rotation of the volume of interest of FIG. 6 so that object 337 is visible.

Figure 8:
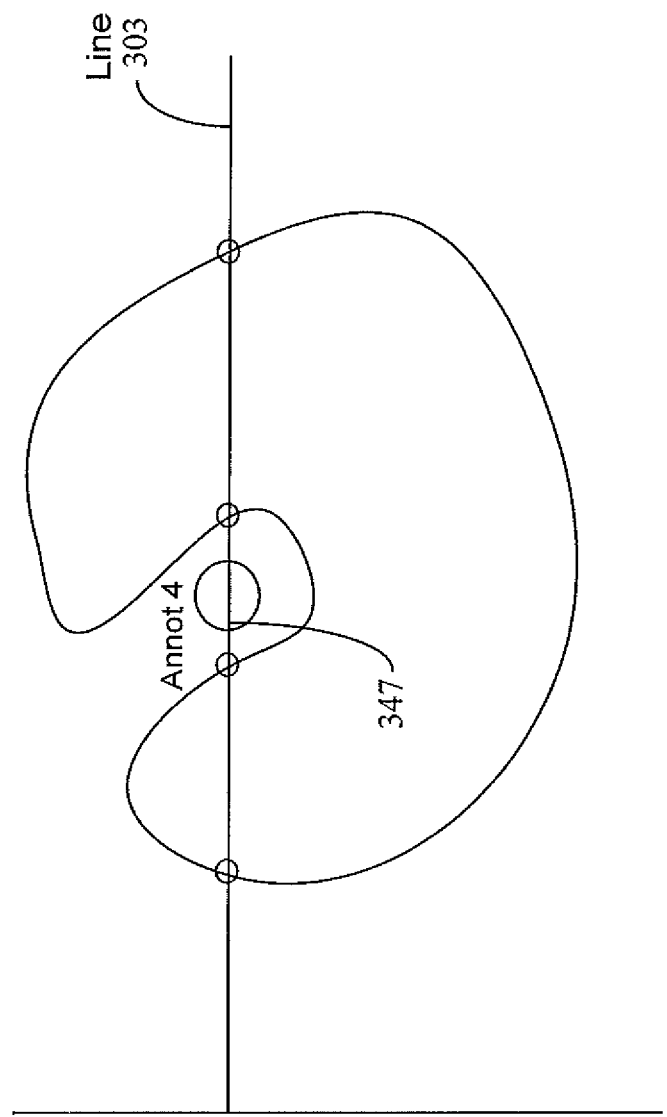
Figure 9:
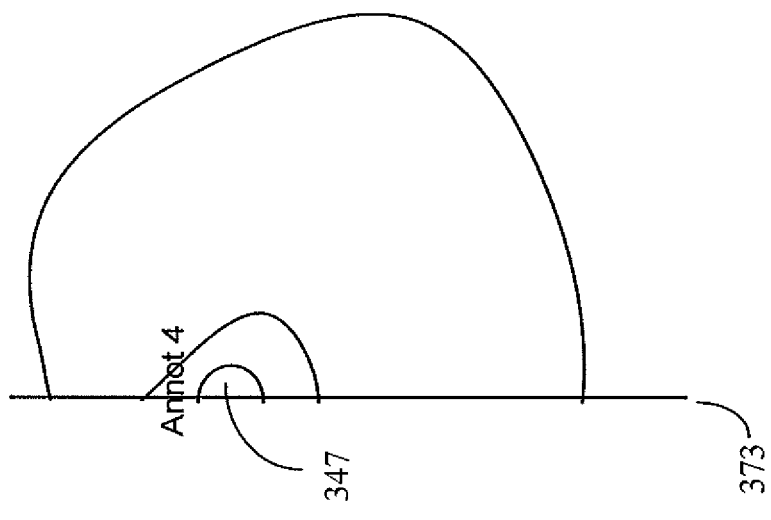

FIG. 8 shows that object 347 is hidden but not completely surrounded by mesh 305. Image data processor 15 determines that a rotation of the volume by 180 degrees will not make the object visible and treats the object as being completely surrounded by the mesh, FIG. 9 illustrates an updated scene including a hidden but not completely surrounded object. As displayed in the system treats the annotation object as if it was completely surrounded by the mesh and generates an image cross-section 373 through the anatomical volume of interest to show annotation object 347 of FIG. 8. In another embodiment processor 15 automatically, iteratively and incrementally rotates the volume until the object is visible by determining when an intersection of object 347 and line 303 is nearer screen 315 than intersection of mesh 305 with line 303.

Figure 11:
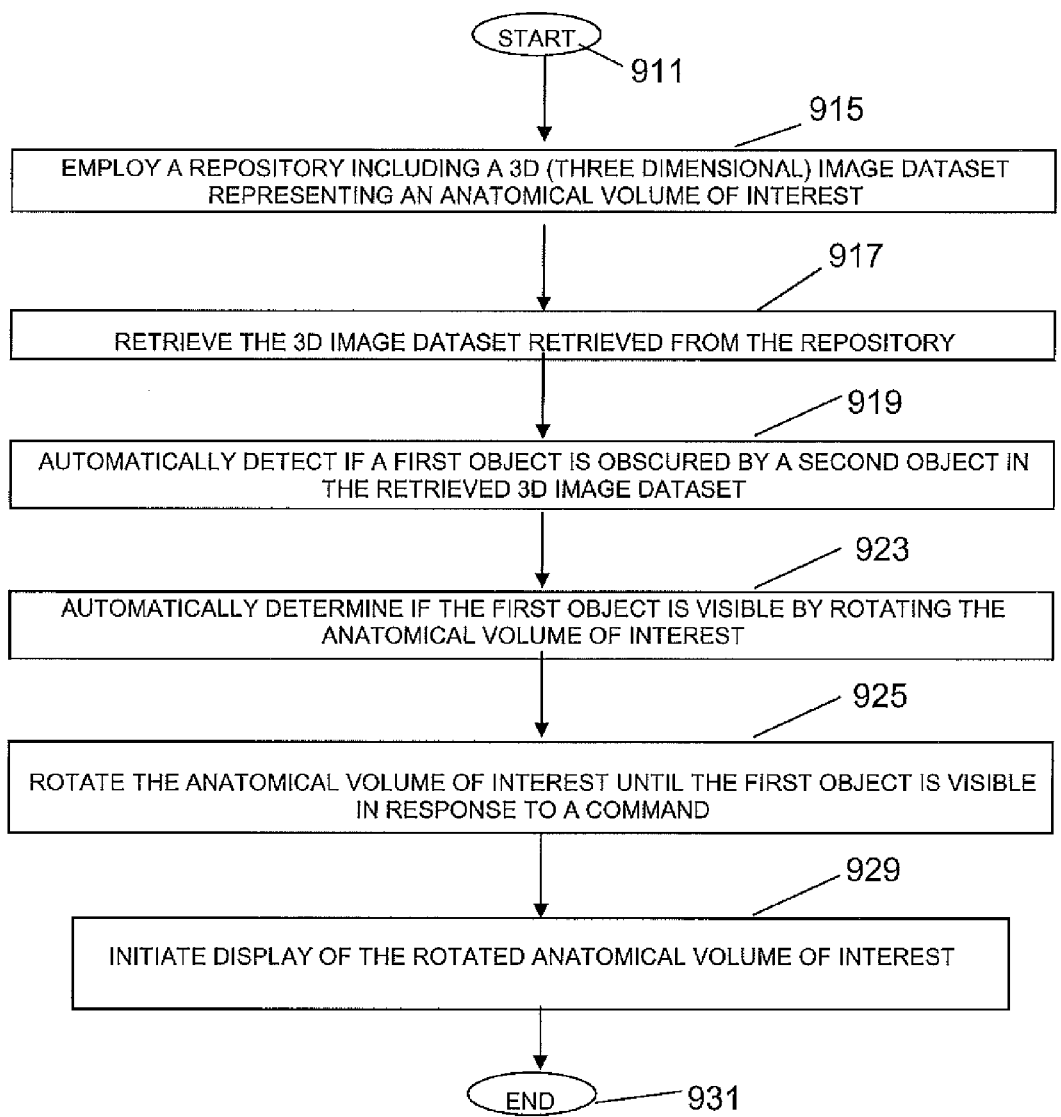
FIG. 11 shows a flowchart of a process employed by an image data processing system, for automatically displaying potentially hidden features in 3D (three dimensional) medical image data, according to invention principles.

FIG. 11 shows a flowchart of a process employed by image data processing system 10 (FIG. 1), for automatically displaying potentially hidden features in 3D (three dimensional) medical image data. In step 915 following the start at step 911, system 10 employs repository 17 for storing a 3D (three dimensional) image dataset representing an anatomical volume of interest. In step 917 image data processor 15 retrieves the 3D image dataset from repository 17. Image data processor 15 in step 919 processes the retrieved 3D image dataset by automatically detecting if a first object is obscured by a second object in the 3D image dataset by determining an intersection of a projection line and the second object is nearer a display screen than an intersection of the projection line and the first object. In one embodiment the first object is an annotation object and the second object is at least one of, (a) an anatomical object, (b) an annotation object and (c) the anatomical volume of interest. Image data processor 15 automatically initiates the processing of the 3D image dataset in response to a user command to at least one of, (a) access a file related to the anatomical volume of interest, (b) display an image representing the anatomical volume of interest and (c) user selection of an item representing the first object in a window displaying a list of objects. In response to image data processor 15 determining the first object will not be made visible by rotating the anatomical volume of interest, the image data processor initiates generation of data representing an image cross-section through the anatomical volume of interest and showing the first object. Further, image data processor 15 automatically detects if the first object cannot be made visible by rotation of the volume of interest by determining intersection points of a projection line and the second object encompass an intersection point of the projection line and the first object. In addition in one embodiment, image data processor 15 automatically, iteratively and incrementally rotates the volume of interest until the first object is visible by determining when an intersection of the first object and a projection line is nearer a display screen than an intersection of the second object and the projection line.

In step 923, processor 15 automatically determines if the first object is visible by rotating the anatomical volume of interest by determining an intersection of the projection line and the first object becomes nearer a display screen than an intersection of the projection line and the second object, in response to rotating the volume of interest.

In step 925, processor 15 rotates the anatomical volume of interest until the first object is visible in response to a command. The command is automatically generated by image data processor 15 or is a user initiated command. Display processor 36 in step 929 initiates display of the rotated anatomical volume of interest. Display processor 36 initiates display of an image window including a message indicating the first object is hidden and an image window including a display item enabling a user to initiate viewing of the first object. The process of FIG. 11 terminates at step 931.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example, and is conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 1-11 are not exclusive. Other systems, processes and image controls may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The system advantageously determines if an annotation object is hidden by determining what objects intersect a line and by determining the best way to adjust the scene (e.g., by rotation or by generation of a cross-section) to make the object of interest visible. Further, the processes and applications may, in alternative embodiments, be located on one or more (e.g., distributed) processing devices on a network linking the units of FIG. 1. Any of the functions, image controls and steps provided in FIGS. 1-11 may be implemented in whole or in part in hardware, software or a combination of both.

What is claimed is:

1. An image data processing system, comprising:
a repository including a 3D (three dimensional) image dataset representing an anatomical volume of interest;
an image data processor for processing the 3D image dataset by,
(a) receiving a command to display a first object in the 3D image dataset,
(b) automatically detecting that the first object is obscured by a second object in the 3D image dataset when viewed from a particular viewing direction by automatically determining distance data indicating that said second object is closer to a display screen than the first object based on coordinates of the first and second objects in the 3D image dataset,
(c) in response to the detection that the first object is obscured by the second object in the 3D image dataset when viewed from the particular viewing direction, automatically determining whether said first object would be visible from said particular viewing direction upon rotation of said anatomical volume of interest with respect to the particular viewing direction,
(d) if it is determined that the first object would be visible from said particular viewing direction upon rotation of said anatomical volume of interest with respect to the particular viewing direction, automatically rotating said anatomical volume of interest with respect to the particular viewing direction until said first object is visible from said particular viewing direction, and
(e) if it is determined that the first object would not be visible from said particular viewing direction upon rotation of said anatomical volume of interest with respect to the particular viewing direction, generating a cross-sectional image of said anatomical volume of interest and showing said first object; and
a display processor for initiating display of the rotated anatomical volume of interest or the cross-sectional image showing said first object.

2. A system according to claim 1, wherein
said image data processor determines said distance data on a projection line perpendicular to said display screen and
said command is automatically generated by the image data processor.

3. A system according to claim 1, wherein
said command is a user initiated command.

4. A system according to claim 1, wherein
said image data processor determines said distance data on a projection line to a centroid of said first object and perpendicular to said display screen and
said first object is an annotation object and
said second object is at least one of (a) an anatomical object, (b) an annotation object and (c) said anatomical volume of interest.

5. A system according to claim 1, wherein
said command comprises user selection of an item representing said first object in a window displaying a list of objects.

6. A system according to claim 1, wherein
said command comprises at least one of a command to, (a) access a file related to said anatomical volume of interest and (b) display an image representing said anatomical volume of interest.

7. A system according to claim 1, wherein
said display processor initiates display of an image including a message indicating said first object is hidden and enabling a user to initiate viewing of said first object.

8. A system according to claim 1, wherein
said display processor initiates display of an image window including a message indicating said first object is hidden and an image window including a display item enabling a user to initiate viewing of said first object.

9. A system according to claim 1, wherein
said image data processor automatically detects that said first object is obscured by said second object in the 3D image dataset, by determining an intersection of a projection line and said second object is nearer a display screen than an intersection of said projection line and said first object.

10. A system according to claim 1, wherein
said first object is an annotation object,
said second object is said anatomical volume of interest and
said image data processor automatically detects that said first object is obscured by said second object in the 3D image dataset, by determining an intersection of a projection line and said anatomical volume of interest is nearer a display screen than an intersection of said projection line and said annotation object.

11. A system according to claim 1, wherein
said image data processor automatically determines that said first object is visible by rotating the anatomical volume of interest by determining an intersection of a projection line and said first object becomes nearer a display screen than an intersection of said projection line and said second object, in response to rotating said volume of interest.

12. A system according to claim 11, wherein
said first object is an annotation object and
said second object is said anatomical volume of interest.

13. A system according to claim 1, wherein
said image data processor automatically, iteratively and incrementally rotates said volume of interest until said first object is visible by determining when an intersection of said first object and a projection line is nearer a display screen than an intersection of said second object and said projection line.

14. A system according to claim 13, wherein
said first object is an annotation object and
said second object is at least one of, (a) an anatomical object, (b) an annotation object and (c) said anatomical volume of interest.

15. A system according to claim 1, wherein
said image data processor automatically detects if said first object cannot be made visible by rotation of said volume of interest by determining intersection points of a projection line and said second object encompass an intersection point of said projection line and said first object.

16. An image data processing system, comprising:
a repository including a 3D (three dimensional) image dataset representing an anatomical volume of interest;
an image data processor for processing the 3D image dataset by,
(a) receiving a command to display a first object in the 3D image dataset,
(b) automatically detecting that the first object is obscured by a second object in the 3D image dataset when viewed from a particular viewing direction by determining an intersection of a projection line and said second object is nearer a display screen than an intersection of said projection line and said first object by automatically determining distance data indicating that said second object is closer to a display screen than the first object based on coordinates of the first and second objects in the 3D image dataset,
(c) in response to the detection that the first object is obscured by the second objet in the 3D image dataset when viewed from the particular viewing direction, automatically determining whether said first object would be visible from said particular viewing direction upon rotation of said anatomical volume of interest with respect to the particular viewing direction, and
(d) if it is determined that the first object would be visible from said particular viewing direction upon rotation of said anatomical volume of interest with respect to the particular viewing direction, automatically rotating said anatomical volume of interest with respect to the particular viewing direction until said first object is visible from said particular viewing direction
(e) if it is determined that the first object would not be visible from said particular viewing direction upon rotation of said anatomical volume of interest with respect to the particular viewing direction, generating a cross-sectional image of said anatomical volume of interest and showing said first object; and
a display processor for initiating display of the rotated anatomical volume of interest or the cross-sectional image showing said first object.

17. A system according to claim 16, wherein
said image data processor determines said distance data on said projection line perpendicular to said display screen,
said first object is an annotation object and
said second object is at least one of, (a) an anatomical object, (b) an annotation object and (c) said anatomical volume of interest and
said image data processor automatically determines if said first object is visible by rotating the anatomical volume of interest by determining an intersection of said projection line and said first object becomes nearer a display screen than an intersection of said projection line and said second object, in response to rotating said volume of interest.

18. A method employed by an image data processing system, comprising the activities of:
employing a repository including a 3D (three dimensional) image dataset representing an anatomical volume of interest;
employing at least one computer system for,
processing the 3D image dataset by,
(a) receiving a command to display a first object in the 3D image dataset,
(b) automatically detecting that the first object is obscured by a second object in the 3D image dataset when viewed from a particular viewing direction by automatically determining distance data indicating that said second object is closer to a display screen than the first object based on coordinates of the first and second objects in the 3D image dataset,
(c) in response to the detection that the first object is obscured by the second object in the 3D image dataset when viewed from the particular viewing direction, automatically determining whether said first object would be visible from said particular viewing direction upon rotation of said anatomical volume of interest with respect to the particular viewing direction,
(d) if it is determined that the first object would be visible from said particular viewing direction upon rotation of said anatomical volume of interest with respect to the particular viewing direction, automatically rotating said anatomical volume of interest with respect to the particular viewing direction until said first object is visible from said particular viewing direction (e) if it is determined that the first object would not be visible from said particular viewing direction upon rotation of said anatomical volume of interest with respect to the particular viewing direction, generating a cross-sectional image of said anatomical volume of interest and showing said first object; and initiating display of the rotated anatomical volume of interest or the cross-sectional image showing said first object.

19. A method according to claim 18, wherein said automatically detecting that the first object is obscured by the second object in the 3D image dataset comprises automatically determining an intersection of a projection line and said second object is nearer a display screen than an intersection of said projection line and said first object and said activity of automatically determining if said first object would be visible by rotating said anatomical volume of interest comprises automatically determining if said first object would be visible by rotating the anatomical volume of interest by determining an intersection of said projection line and said first object becomes nearer a display screen than an intersection of said projection line and said second object, in response to rotating said volume of interest.

20. A method according to claim 19, wherein said distance data is determined on a projection line perpendicular to said display screen, said first object is an annotation object and said second object is at least one of, (a) an anatomical object, (b) an annotation object and (c) said anatomical volume of interest.

* * * * *